(12) United States Patent
Choi et al.

(10) Patent No.: US 9,195,927 B2
(45) Date of Patent: Nov. 24, 2015

(54) APPARATUS AND METHOD FOR SELECTING SECURE ELEMENT IN NEAR FIELD COMMUNICATION DEVICE

(71) Applicant: Samsung Electronics Co., Ltd., Gyeonggi-do (KR)

(72) Inventors: Bong-Sik Choi, Gyeongsangbuk-do (KR); Dae-Haeng Cho, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 204 days.

(21) Appl. No.: 13/888,619

(22) Filed: May 7, 2013

(65) Prior Publication Data
US 2013/0299596 A1 Nov. 14, 2013

(30) Foreign Application Priority Data

May 8, 2012 (KR) .................. 10-2012-0048667

(51) Int. Cl.
| G06K 19/06 | (2006.01) |
| G06K 19/07 | (2006.01) |
| G06Q 20/32 | (2012.01) |
| H04W 4/00 | (2009.01) |
| H04W 12/08 | (2009.01) |
| G06Q 20/22 | (2012.01) |
| H04L 29/06 | (2006.01) |

(52) U.S. Cl.
CPC .......... *G06K 19/0725* (2013.01); *G06Q 20/227* (2013.01); *G06Q 20/3227* (2013.01); *G06Q 20/3278* (2013.01); *H04W 4/008* (2013.01); *H04W 12/08* (2013.01); *H04L 63/0492* (2013.01)

(58) Field of Classification Search
USPC ................ 235/492, 493; 726/3; 713/150, 153
See application file for complete search history.

(56) References Cited

U.S. PATENT DOCUMENTS

| 2010/0260388 A1* | 10/2010 | Garrett et al. ................. 382/124 |
| 2011/0053504 A1 | 3/2011 | Corda |
| 2012/0032789 A1 | 2/2012 | Ichimaru et al. |
| 2013/0086375 A1* | 4/2013 | Lyne et al. .................... 713/153 |
| 2013/0305035 A1* | 11/2013 | Lyne et al. .................... 713/150 |

FOREIGN PATENT DOCUMENTS

| CN | 102325210 A | 1/2012 |
| EP | 1 798 867 A2 | 6/2007 |

(Continued)

OTHER PUBLICATIONS

"Mobile NFC technical guidelines", Nov. 2007 version 2.0 and Apr. 2007 version 1.0, XP-002558746.

(Continued)

*Primary Examiner* — Allyson Trail
(74) *Attorney, Agent, or Firm* — Cha & Reiter, LLC.

(57) ABSTRACT

An apparatus and method for selecting a Secure Element (SE) in a Near Field Communication (NFC) device are provided. Identifiers (IDs) are displayed to indicate which application programs correspond to a plurality of SEs. Upon selection of one of the IDs, an SE corresponding to the selected application-program ID from among the plurality of SEs is activated. An NFC controller is configured to select an SE from one of at least three schemes including a User Selection Scheme, Automatic Selection Scheme, and a Hybrid Scheme.

20 Claims, 7 Drawing Sheets

(56) References Cited

FOREIGN PATENT DOCUMENTS

EP 2 211 480 A1 7/2010
WO 2010/032215 A1 3/2010

OTHER PUBLICATIONS

Madlmayr et al., "Management of Multiple Cards in NFC-Devices", Sep. 8, 2008, XP-019104509.

"Requirements for NFC Mobile: Management of Multiple Secure Elements", Feb. 2010, Version 1.0, GlobalPlatform Inc., XP-002714682.

* cited by examiner

APPARATUS AND METHOD FOR SELECTING SECURE ELEMENT IN NEAR FIELD COMMUNICATION DEVICE

CLAIM OF PRIORITY

This application claims the benefit under 35 U.S.C. §119 (a) from a Korean Patent Application filed in the Korean Intellectual Property Office on May 8, 2012 and assigned Serial No. 10-2012-0048667, the entire disclosure of which is hereby incorporated by reference in its entirety.

BACKGROUND OF THE INVENTION

1. Field of the Invention

The present invention relates to a Near Field Communication (NFC) device. More particularly, the present invention relates to an apparatus and method for selecting a Secure Element (SE) in a NFC device, particularly when there may be more than one SE provided.

2. Description of the Related Art

With the development of Near Field Communication (NFC) techniques, NFC devices now can provide various services. In particular, the services provided in the NFC devices may include a card mode for executing functions such as a credit card function, a transportation card function, and so forth. To execute the card mode, a Secure Element (SE) for encrypting and storing user related information is required.

When a plurality of SEs are provided, since it is not predefined which SE among them is to be used for an NFC controller to forward data, a NFC device cannot efficiently support the plurality of SEs. Therefore, there is a need for a scheme for solving this problem.

SUMMARY OF THE INVENTION

Accordingly, the present invention proposes a method and apparatus for selecting one of a plurality of Secure Elements (SEs) to be used for an NFC controller to forward data.

The present invention also proposes a method and apparatus for selecting one of a plurality of SEs by using one or more application programs associated with the plurality of SEs.

The present invention also proposes a method and apparatus for selecting one of a plurality of SEs, taking account of whether a command message received from a Near Field Communication (NFC) card reader has responded.

According to an exemplary aspect of the present invention, there is provided an apparatus for selecting a Secure Element (SE) in a Near Field Communication (NFC) device, the apparatus preferably including an SE unit including a plurality of SEs and a main controller for displaying identifiers (IDs) indicating application programs respectively corresponding to one more of the plurality of SEs, and upon selection of one of the IDs, activating an SE corresponding to the selected application-program ID among the plurality of SEs.

According to another exemplary aspect of the present invention, there is provided an apparatus for selecting a Secure Element (SE) in a Near Field Communication (NFC) device, the apparatus including an SE unit including a plurality of SEs and a main controller for, upon receiving a command message for an NFC service from an NFC card reader, checking whether a response message with respect to the command message is received from at least one of the plurality of SEs, when receiving the response message from one of the plurality of SEs, then maintaining connection of a channel for the SE which sends the response message and releasing connection of channels for the other SEs, and processing the NFC service through the SE for which channel connection is maintained.

According to another exemplary aspect of the present invention, there is provided a method for selecting a Secure Element (SE) in a Near Field Communication (NFC) device, the method preferably including determining and/or displaying identifiers (IDs) indicating application programs corresponding to a plurality of SEs and upon selection of one of the IDs, activating an SE corresponding to the selected application-program ID among the plurality of SEs.

According to another exemplary aspect of the present invention, there is provided a method for selecting a Secure Element (SE) in a Near Field Communication (NFC) device, the method preferably including upon receiving a command message for an NFC service from an NFC card reader, checking whether a response message with respect to the command message is received from at least one of a plurality of SEs, if receiving the response message from one of the plurality of SEs, then maintaining connection of a channel for the SE which sends the response message and releasing connection of channels for the other SEs, and processing the NFC service through the SE for which channel connection is maintained.

BRIEF DESCRIPTION OF THE DRAWINGS

The above and other descriptions and advantages of exemplary embodiments of the present invention will become more apparent to a person of ordinary skill in the art from the following detailed description taken in conjunction with the accompanying drawings, in which.

DETAILED DESCRIPTION

Hereinafter, exemplary embodiments of the present invention will be described in detail with reference to the accompanying drawings. In addition, a detailed description of well-known functions and constructions may not be provided if they unnecessarily obscure appreciation of the subject matter of the present invention by a person of ordinary skill in the art with the description of what is already known.

A Near Field Communication (NFC) device according to an exemplary embodiment of the present invention may be included in a portable terminal. Herein, the term "portable terminal" is to be construed broadly and may constitute a mobile electronic device which can be easily carried such as a video phone, a cellular phone, a smart phone, an International Mobile Telecommunication (IMT)-2000 terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an Electronic(E) book, a portable computer (e.g., a notebook, a tablet, etc.), a digital camera, portable television, or the like, just to name some non-limiting possibilities.

Figure 1:
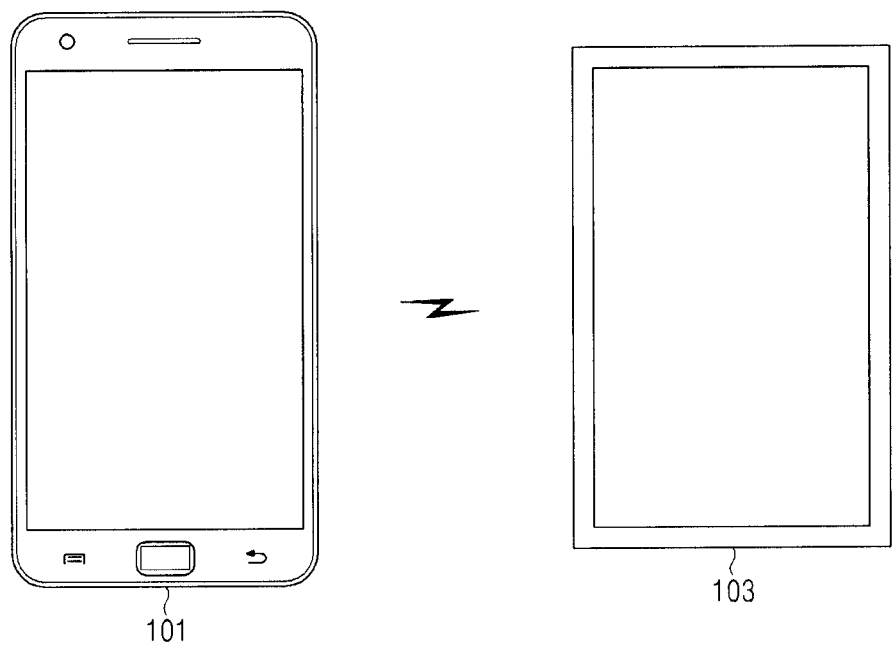
FIG. 1 is a structural diagram of a Near Field Communication (NFC) system according to an exemplary embodiment of the present invention.

FIG. 1 is a structural diagram of an NFC system according to an exemplary embodiment of the present invention.

Referring now to FIG. 1, the NFC system may preferably include a portable terminal 101 and an NFC card reader 103. The NFC card reader 103 can wirelessly read, for example, smart cards, for micro-payment transactions.

The NFC card reader 103 emits a predetermined Radio Frequency (RF) within a predetermined region, and upon receiving a response message with respect to the emitted RF from the portable terminal 101, performs an NFC service by using the portable terminal 101. For example, the predetermined region may be within a radius of about 10 cm from the NFC card reader 103.

Herein, the NFC service refers to a service executed using the NFC device included in the portable terminal 101. The NFC service may include, for example, a terminal mode, a card mode (or NFC card mode), and a Peer-To-Peer (P2P) mode. The terminal mode executes a function of reading a tag and inputting information to the tag; the card mode executes a transportation card or credit card function; and the P2P mode executes a function of sharing data. For example, the data may include business card or multimedia data.

The portable terminal 101 preferably includes the NFC device which includes a plurality of Secure Elements (SEs). The portable terminal 101 selects one of the plurality of SEs according to user's selection or automatically.

More specifically, in a first exemplary embodiment of the present invention, the portable terminal 101 checks if it enters the NFC card mode. If so, the portable terminal 101 searches for one or more application programs having authority for the NFC card mode from among all application programs.

The portable terminal 101 may check whether an application program has authority for the NFC card mode based on program specifications of that application program.

Herein, program specifications of an application program may include authority for accessing the NFC card mode, an identifier (ID) of the application program, and an SE type associated with the application program. For example, if the application program is a Java Platform-based program, a file name of the program specifications may be "jad". Another example may be an Android-based program and a file name of the program specifications may be "mainfest".

The ID of the application program may comprise at least one of a name and an icon of the application program. For example, the program specifications may include a name of the application program. Herein, the name of the application program refers to a name to be displayed on a display 203, and for example, the name may comprise a Google Wallet, an Orange Wallet, a SAMSUNG Wallet, or the like. The SE type may comprise an eSE, UICC, an ASSD, or the like.

The portable terminal 101 identifies SE types corresponding to respective application programs having authority for the NFC card mode based on program specifications of the respective application programs, and stores the identified SE types for the respective application programs.

Thereafter, the portable terminal 101 can display IDs of the found application programs, and checks whether one of the displayed IDs is selected. If an ID of a particular application program is selected from the displayed IDs, the portable terminal 101 activates an SE corresponding to the selected application-program ID among the plurality of SEs, and processes the NFC card mode by using the activated SE.

In a second exemplary embodiment of the present invention, the portable terminal 101 senses a Radio Frequency (RF) emitted from the NFC card reader 103, and generates RF type information regarding the sensed RF. Herein, the RF type information regarding the sensed RF may include band information of the sensed RF. For example, if the sensed RF is 13.56 MHz, the RF type information regarding the sensed RF may include 13.56 MHz which is a band of the sensed RF.

The portable terminal 101 checks whether the generated RF type information exists in previously stored RF type information of the plurality of SEs. Herein, RF type information of the plurality of SEs may include RF frequency band information associated with each of the plurality of SEs. For example, if, among the plurality of SEs, a first SE operates in 13.55 MHz through 13.60 MHz, and a second SE operates in 13.20 MHz through 13.50 MHz, then RF type information of the plurality of SEs may include a band of 13.20 MHz through 13.50 MHz and a band of 13.55 MHz through 13.60 MHz which are the operating RF bands for the plurality of SEs.

In this example, if the generated RF type information does not exist in the previously stored RF type information, the NFC service is then terminated. On the other hand, if the generated RF type information exists, the portable terminal 101 sends to the NFC card reader 103 a response message indicating that the RF is successfully sensed. The portable terminal 101 checks as to whether a command message for the NFC service is received from the NFC card reader 103.

If the command message is received, the portable terminal 101 forwards the received command message to each of the plurality of SEs and checks as to whether a response message with respect to the command message is received from one of the plurality of SEs. If no response message is received in response to the command message, the portable terminal 101 generates a response message indicating a processing failure with respect to the command message, sends the generated response message to the NFC card reader 103, and terminates the NFC service. On the other hand, if the response message with respect to the command message is received, the portable terminal 101 maintains connection of a channel for only the SE which sends the response message, and releases connection of channels for the SEs which does not send the response message. The portable terminal 101 then sends the response message received from the SE to the NFC card reader 103.

The portable terminal 101 checks whether a command message for the NFC service is received from the NFC card reader 103. If so, the portable terminal 101 forwards the received command message to the SE, receives a response message with respect to the command message from the SE, and then sends the received response message to the NFC card reader 103.

The portable terminal 101 checks as to whether the NFC service is terminated. If the NFC service is not terminated, the portable terminal 101 repeats an operation of receiving a command message from the NFC card reader 103, forwarding the command message to the SE, and sending a response message with respect to the command message to the NFC card reader 103, until termination of the NFC service.

In a third exemplary embodiment of the present invention, the portable terminal 101 senses an RF emitted from the NFC card reader 103 and generates RF type information regarding the sensed RE. The portable terminal 101 checks whether the generated RF type information exists in previously stored RF type information of the plurality of SEs. If not, then the NFC service is terminated. On the other hand, when the generated RF type information exists in the previously stored RF type information, the portable terminal 101 sends to the NFC card reader 103 a response message indicating that the RF has been successfully sensed.

The portable terminal 101 checks whether a command message for the NFC service is received from the NFC card reader 103. If so, the portable terminal 101 forwards the received command message to each of the plurality of SEs, and checks if a response message with respect to the command message is received from at least one of the plurality of SEs.

If no response message is received in response to the command message, the portable terminal 101 generates a response message indicating a processing failure with respect to the command message, sends the generated response message to the NFC card reader 103, and then terminates the NFC service.

On the other hand, when a response message with respect to the command message is received, the portable terminal 101 checks whether the response message is received from each of the plurality of SEs. If the response message is received from one of the plurality of SEs, the portable terminal 101 maintains connection of a channel for only the SE which sends the response message, and releases connection of channels for the other SEs which does not send the response message. The portable terminal 101 sends the response message received from that SE to the NFC card reader 103.

If the response message is received from each of the plurality of SEs, the portable terminal 101 outputs icons indicating the plurality of SEs or IDs of application programs associated with the plurality of SEs for SE selection. For example, the portable terminal 101 may output names of the application programs associated with the plurality of SEs. The portable terminal 101 checks to determine if one of the pluralities of SEs is selected. If a name of an application program is selected from among the names of the application programs associated with the plurality of SEs, the portable terminal 101 may determine that a corresponding SE is selected from among the plurality of SEs.

Once the particular SE is selected, the portable terminal 101 then maintains connection of a channel for only the selected SE among the plurality of SEs, releases connection of channels for the other SEs, and sends a response message received from the selected SE to the NFC card reader 103.

The portable terminal 101 checks if a command message for the NFC service is received from the NFC card reader 103. If the command message is received, the portable terminal 101 forwards the received command message to the SE for which channel connection is maintained, receives a response message with respect to the command message from that SE, and sends the received response message to the NFC card reader 103. The portable terminal 101 checks if the NFC is terminated. If the NFC service is not terminated, the portable terminal 101 repeats an operation of receiving a command message from the NFC card reader 103, forwarding the received command message to a corresponding SE, and sending a response message with respect to the command message to the NFC card reader 103, until termination of the NFC service.

Figure 2:
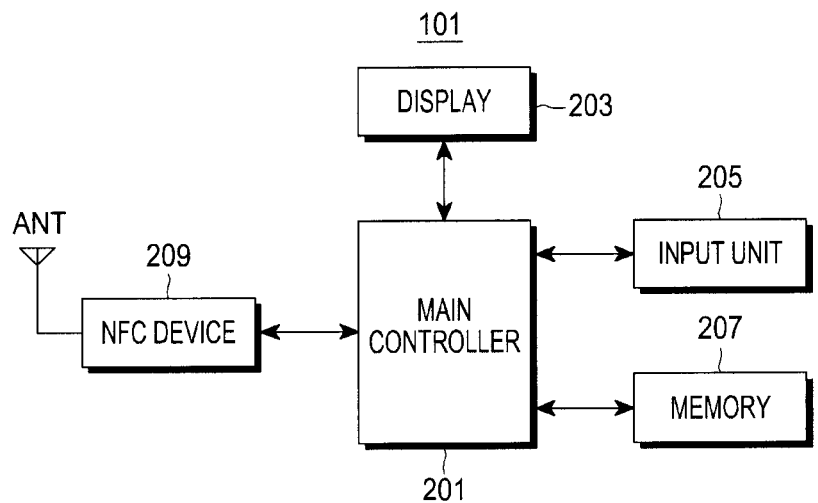
FIG. 2 is a block diagram of a portable terminal according to an exemplary embodiment of the present invention.

FIG. 2 is a block diagram of the portable terminal 101 according to an exemplary embodiment of the present invention. Now referring to FIG. 2, operations of the portable terminal 101 will be described.

Referring to FIG. 2, the portable terminal 101 may preferably include a main controller 201, a display 203, an input unit 205, a memory 207, and an NFC device 209.

The display 203 displays an image signal on a screen, and displays data requested to be output from the main controller 201. If the display 203 is implemented is as a touch display screen, for example, of a capacitive type or a resistive type, the input unit 105 may include only preset minimum keys and the display 203 may replace a part of a key input function of the input unit 205.

The memory 207, which comprises a non-transitory machine readable medium may include program and data memories. Herein, the program memory stores booting and Operating System (OS) for controlling a general operation of the portable terminal 101, and the data memory stores various data generated in operation of the portable terminal 101.

In particular, the memory 207 stores IDs of application programs corresponding to a plurality of SEs. Herein, each of the application programs is associated with one of the plurality of SEs, and processes the card mode by using the associated SE.

For example, the memory 207 may store application program IDs corresponding to a plurality of SEs as shown in Table 1.

TABLE 1

| SE | Application Program ID |
|---|---|
| First SE | aaa |
| Second SE | bbb |

Herein, "aaa" represents an ID of a first application program associated with the first SE, and "bbb" represents an ID of a second application program associated with the second SE. The ID of the first or second application program represents a unique ID assigned to the application program.

The main controller 201 performs an overall operation of the portable terminal 101. In particular, the main controller 201, which comprises hardware including a processor or microprocessor, upon receiving an SE selection request from the NFC device 209, displays names of a plurality of application programs corresponding to a plurality of SEs based on IDs of the plurality of application programs for the plurality of SEs stored in the memory 207, and checks if one of the displayed names of the application programs is selected by a user. If the is a selection by a user, the main controller 201 sends an ID of an SE corresponding to the selected application-program name to the NFC device 209.

The NFC device 209 receives selection of one of the plurality of SEs from the user or automatically selects one of them, and processes the NFC service by using the selected SE.

Figure 3:
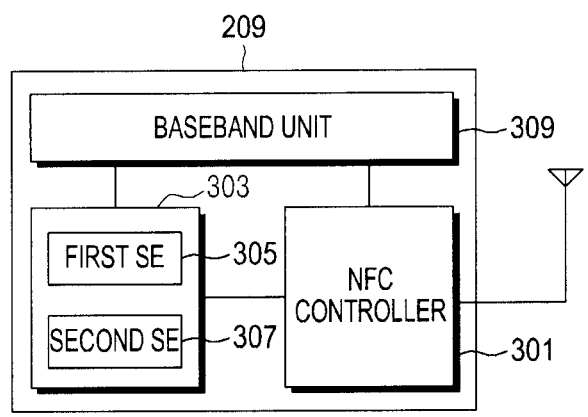
FIG. 3 is a block diagram of an NFC device according to an exemplary embodiment of the present invention.

FIG. 3 is a block diagram of the NFC device 209 according to an exemplary embodiment of the present invention. Now referring to FIG. 3, operations of the NFC device 209 will now be described. Referring to FIG. 3, the NFC device 209 may include an NFC controller 301, an SE unit 303, and a baseband unit 309.

The baseband unit 309 performs radio frequency (RF) communication between the portable terminal 101 and the NFC card reader 103. More specifically, the baseband unit 309 may include an RF transmitter for up-converting a frequency of a transmission signal and amplifying the transmitted signal and an RF receiver for low-noise amplifying a received signal and down-converting the frequency of the received signal.

The SE unit 303 is in charge of security, and stores user related information for payment. The SE unit 303, for example, may include a first SE 305 and a second SE 307. Typically, the first SE 305 may comprise any one of an Embedded SE (eSE), a Universal Integrated Circuit Card (UICC), and Advanced Security Secure Digital (ASSD), and the second SE 307 may comprise any one of the other SEs. For example, if the first SE 305 is eSE, the second SE 307 may be an UICC or ASSD.

Herein, eSE is a type of an SE configured with one chipset in portable terminals. The ownership of eSE is owned by a manufacturer. The UICC is a type of an SE configured in a USIM chip of a portable terminal, and the ownership thereof is owned by a common carrier. The ASSD is a type of an SE configured in a micro SD card of a portable terminal, and the ownership thereof is owned by a manufacturer or a common carrier.

The NFC controller 301 controls an overall operation of the NFC device 209. More specifically, the NFC controller 301 is configured to select an SE in the following three schemes comprising, a User Selection Scheme, Automatic Selection Scheme, and a Hybrid Scheme to be discussed herein below.

1) User Selection Scheme The NFC controller 301 checks if the NFC device 209 enters the card mode. If the NFC device entered card mode, the NFC controller 301 sends an SE selection request to the main controller 201 and receives an ID indicating an SE selected by a user from among a plurality of SEs in response to the sent SE selection request. The NFC controller 301 activates the SE corresponding to the received ID from among the plurality of SEs, and executes the card mode by using the activated SE.

2) Automatic Selection Scheme

The NFC controller 301 senses an RF emitted from the NFC card reader 103, generates RF type information regarding the sensed RF, and checks whether the generated RF type information exists in previously stored RF type information for a plurality of SEs. If the generated RF type information does not exist in the previously stored RF type information, the NFC controller 301 performs no operation with respect to the sensed RF. On the other hand, if the generated RF type information exists, the NFC controller 301 sends to the NFC card reader 103 a response message indicating that the RF has been successfully sensed.

The NFC controller 301 checks to determine whether a command message for an NFC service is received from the NFC card reader 103. If the command message is received, the NFC controller 301 forwards the received command message to each of the plurality of SEs, and checks whether a response message with respect to the command message is received from one of the plurality of SEs.

If no response message is received in response to the command message, the NFC controller 301 generates a response message indicating a processing failure with respect to the command message and sends the generated response message to the NFC card reader 103. On the other hand, if a response message with respect to the command message is received, the NFC controller 301 maintains connection of a channel for only the SE which sends the response message and releases connection of channels for the other SEs which does not send the response message. The NFC controller 301 sends the response message received from the SE to the NFC card reader 103, and checks to determine whether a command message for the NFC service is received from the NFC card reader 103.

If the command message is received, the NFC controller 301 forwards the received command message to the SE, receives a response message with respect to the command message from the SE, and sends the received response message to the NFC card reader 103. The NFC controller 301 checks to determine whether the NFC service is terminated. If the NFC service is not terminated, the NFC controller 301 repeats an operation of receiving a command message from the NFC card reader 103, forwarding the command message to the SE, and sending a response message with respect to the command message to the NFC card reader 103, until termination of the NFC service.

3) Hybrid Scheme

Herein, the hybrid scheme is a combination of the user selection scheme and the automatic selection scheme.

More specifically, the NFC controller 301 senses an RF signal emitted from the NFC card reader 103, generates RF type information regarding the sensed RF, and checks to determine whether the generated RF type information exists in previously-stored RF type information for a plurality of SEs. If the generated RF type information does not exist in the previously-stored RF type information, the NFC controller 301 does not perform any operation with respect to the sensed RF. On the other hand, if the generated RF type information exists, the NFC controller 301 sends to the NFC card reader 103 a response message indicating that the RF has been successfully sensed.

The NFC controller 301 checks to determine whether a command message for the NFC service is received from the NFC card reader 103. If the command message is received, the NFC controller 301 forwards the received command message to each of the plurality of SEs, and checks whether a response message with respect to the command message has been received from each of the plurality of SEs.

In the case where no response message is received in response to the command message, the NFC controller 301 generates a response message indicating a processing failure with respect to the command message and sends the generated response message to the NFC card reader 103.

On the other hand, if a response message with respect to the command message is received from each of the plurality of SEs, the NFC controller 301 sends an SE selection request to the main controller 201 and receives an ID indicating an SE selected by the user from among the plurality of SEs in response to the sent SE selection request. The NFC controller 301 maintains connection of a channel only for the SE corresponding to the received ID among the plurality of SEs, and releases connection of channels for the other SEs. On the other hand, if a response message with respect to the command message is received from an SE, the NFC controller 301 maintains connection of a channel only for the SE from which the response message is received, and releases connection of channels for the other SEs.

The NFC controller 301 sends the response message received from the SE to the NFC card reader 103, and checks to determine whether a command message for the NFC service is received from the NFC card reader 103.

If the command message is received, the NFC controller 301 forwards the received command message to the SE, receives the response message with respect to the command message to the SE, and forwards the received response message to the NFC card reader 103. The NFC controller 301 checks whether or not the NFC service is terminated. If not, the NFC controller 301 repeats an operation of receiving a command message from the NFC card reader 103, forwarding the command message to the SE, and sending a response message with respect to the command message to the NFC card reader 103, until there is termination of the NFC service.

Figure 4:
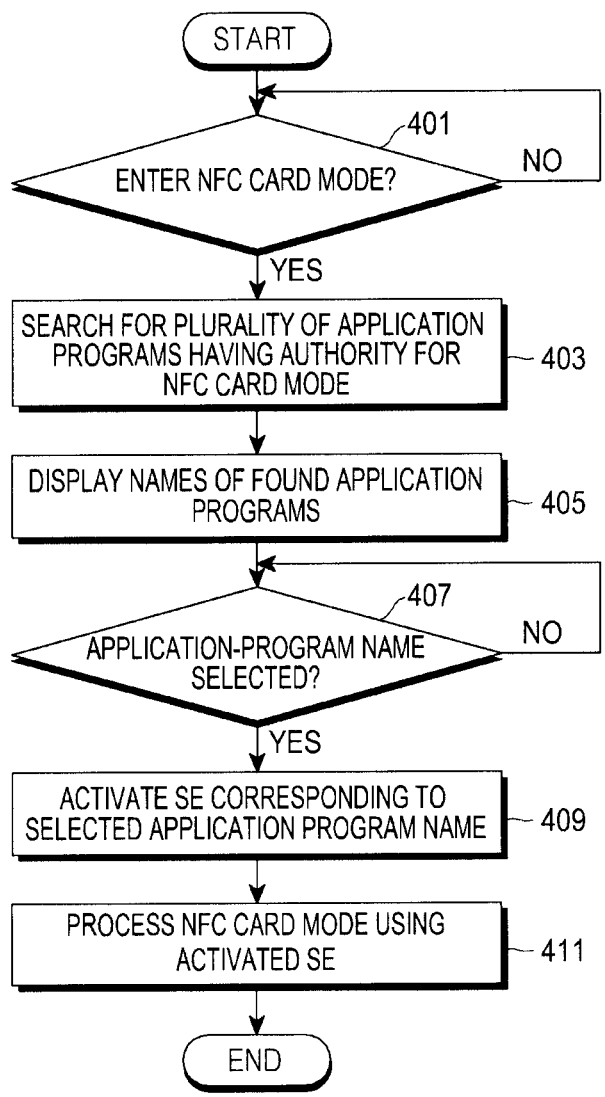
FIG. 4 is a flowchart providing an overview of exemplary operation of a method for selecting a Security Element (SE) in a portable terminal according to a first exemplary embodiment of the present invention.

FIG. 4 is a flowchart of a method for selecting an SE in the portable terminal 101 according to the first exemplary embodiment of the present invention.

Referring now to FIG. 4, in step 401, the portable terminal 101 checks whether card mode has been entered. If card mode (in an embodiment NFC card mode) has been entered, the portable terminal 101 then performs step 403. However, in the event that the portable terminal 101 enters the card mode, then it repeats step 401.

In step 403, the portable terminal 101 searches for at least one application programs having authority for the NFC card mode from among all application programs and can then perform step 405.

With regard to step 403, more specifically, the portable terminal 101 may determine whether each application program has authority for the NFC card mode based on program specifications of the application program.

Herein, program specifications of an application program may include, for example, authority for the NFC card mode, a name of the application program, and an SE type associated with the application program. For example, if the application program is a Java Platform-based program, a file name of the program specifications may be "jad". Another example may be an Android-based program and a file name of the program specifications may be "mainfest". The name of the application program refers to a name to be displayed on a display 203, and for example, the name may be a Google Wallet, an Orange Wallet, a Samsung Wallet, or the like. The SE type may be eSE, UICC, an ASSD, or the like.

The portable terminal 101 identifies an SE type corresponding to each of the application programs having authority for the NFC card mode based on the program specifications of the application program, and stores the identified SE type for each application program, as shown in Table 1.

In step 405, the portable terminal 101 displays names of the found application programs and performs step 407. In step 407, the portable terminal 101 checks whether one of the displayed names of the application programs is selected. If so, the portable terminal 101 then performs step 409. However, unless one of the displayed names is selected, the portable terminal 101 repeats performance of step 407.

At step 409, the portable terminal 101 activates an SE corresponding to the selected application-program name among the plurality of SEs, and then at step 411 processes the NFC card mode by using the activated SE in step 411.

Figure 5:
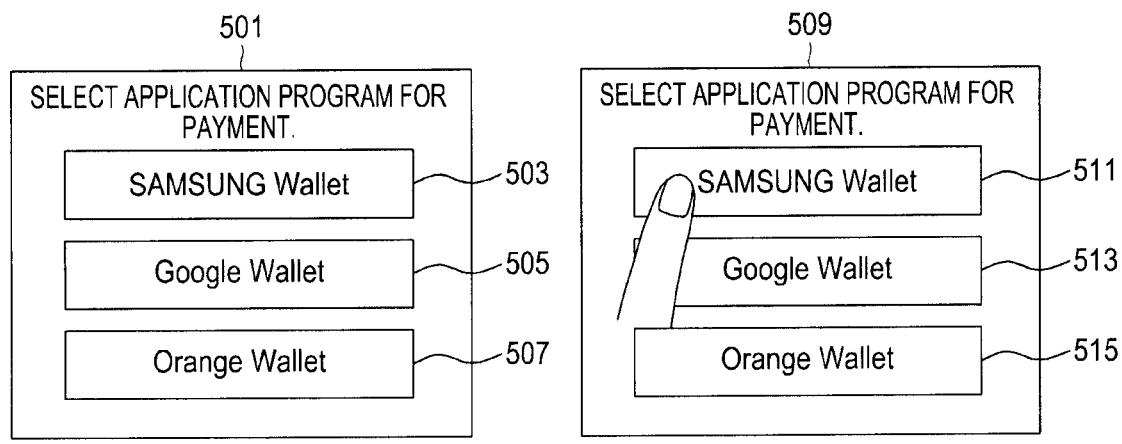
FIG. 5 is a diagram showing screens which are output for selecting an SE in a portable terminal according to the first exemplary embodiment of the present invention.

FIG. 5 is a diagram showing screens output for selecting an SE in the portable terminal 101 according to the first exemplary embodiment of the present invention.

Referring now to FIG. 5, a screen 501 is a screen on which the portable terminal 101 displays names of application programs having authority for the NFC card mode. For example, the portable terminal 101 may display a SAMSUNG Wallet 503, a Google Wallet 505, and an Orange Wallet 507.

A screen 503 is a screen on which the user selects one of the displayed names of the application programs. For example, the portable terminal 101 may determine which one of the displayed SAMSUNG Wallet 503, Google Wallet 505, and Orange Wallet 507 is selected as shown on the screen 509. If the SAMSUNG Wallet 503 is selected, the portable terminal 101 may activate an SE associated with the SAMSUNG Wallet 503 among the plurality of SEs.

Figure 6:
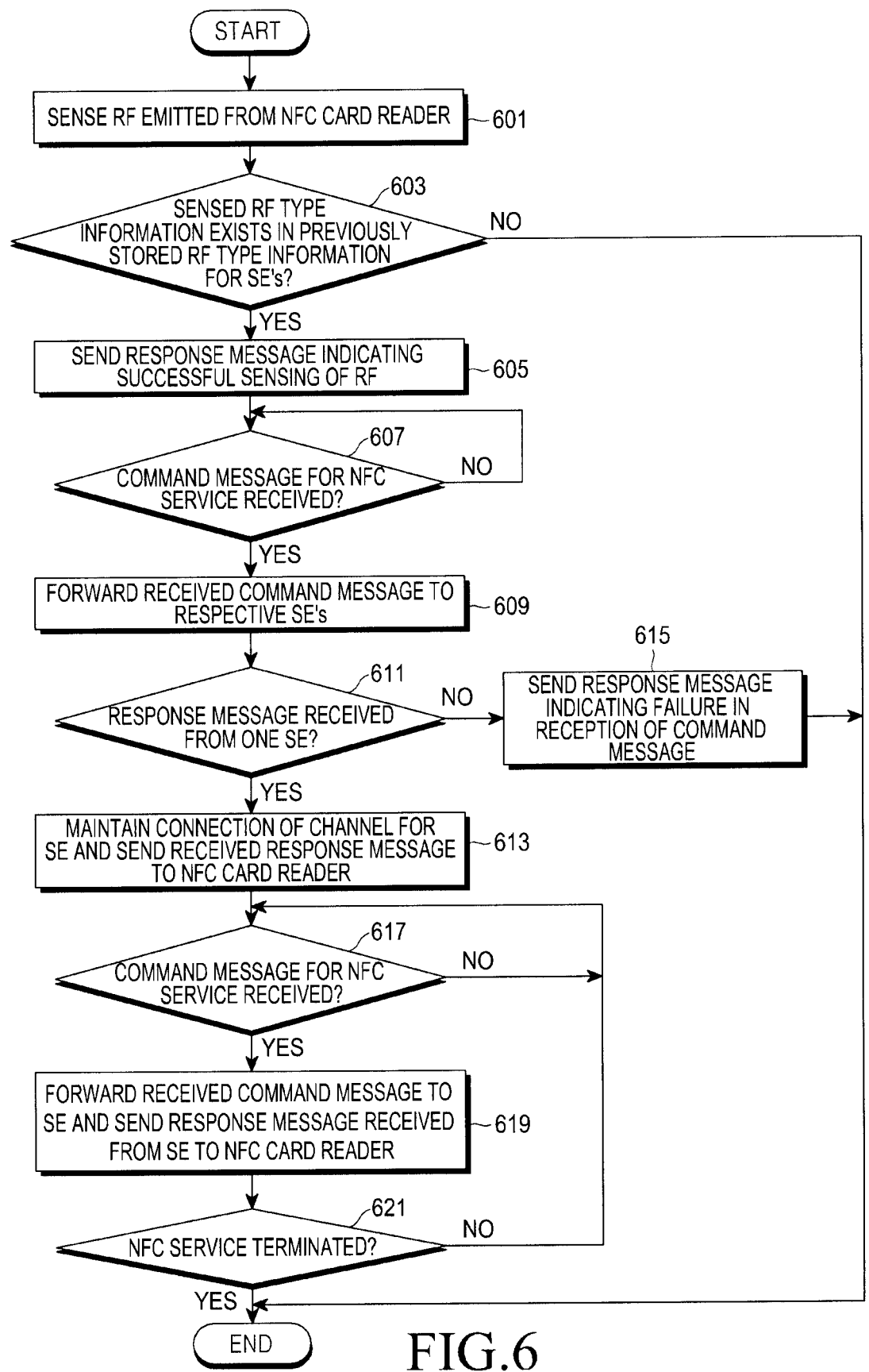
FIG. 6 is a flowchart operation of a method for selecting an SE in an NFC device according to a second exemplary embodiment of the present invention.

FIG. 6 is a flowchart showing exemplary operation of a method for selecting an SE in the NFC device 209 according to the second exemplary embodiment of the present invention.

Referring now to FIG. 6, at Step 601 the portable terminal 101 senses an RF emitted from the NFC card reader 103 and generates RF type information regarding the sensed RF.

At step 603, the portable terminal 101 checks whether the generated RF type information exists in previously-stored RF type information for a plurality of SEs. If the generated RF type information does not exist in the previously stored RF type information, the portable terminal 101 terminates the NFC service. On the other hand, if the generated RF type information exists, the portable terminal 101 performs step 605.

At step 605, the portable terminal 101 sends to the NFC card reader 103 a response message indicating that the RF has been successfully sensed.

At step 607, the portable terminal 101 checks as to whether a command message for the NFC service is received from the NFC card reader 103. If so, the portable terminal 101 then performs step 609; if no command message is received, the portable terminal 101 repeats performance of step 607.

At step 609, the portable terminal 101 forwards the received command message to each of the plurality of SEs, and at step 611 checks to determine whether a response message with respect to the command message is received from one of the plurality of SEs. If no response message is received in response to the command message, the portable terminal 101 then performs step 615; otherwise, the portable terminal 101 performs step 613.

At step 615, the portable terminal 101 generates a response message indicating a processing failure with respect to the command message, sends the generated response message to the NFC card reader 103, and terminates the NFC service. At step 613, the portable terminal 101 maintains connection of a channel for only the SE which sends the response message, and releases connection of channels for the other SEs which does not send the response message. The portable terminal 101 sends the response message received from the SE to the NFC card reader 103, and performs step 617.

At step 617, the portable terminal 101 checks to determine whether a command message for the NFC service is received from the NFC card reader 103. If a command message has been received, the portable terminal 101 then performs step 619; if no command message is received, the portable terminal 101 then repeats step 617.

At step 619, the portable terminal 101 forwards the received command message to the SE, receives a response message with respect to the command message from the SE, sends the received response message to the NFC card reader 103, and then performs step 621.

At step 621, the portable terminal 101 checks whether the NFC service is terminated. If not, the portable terminal 101 performs step 617, otherwise, the process is terminated.

Figure 7A:
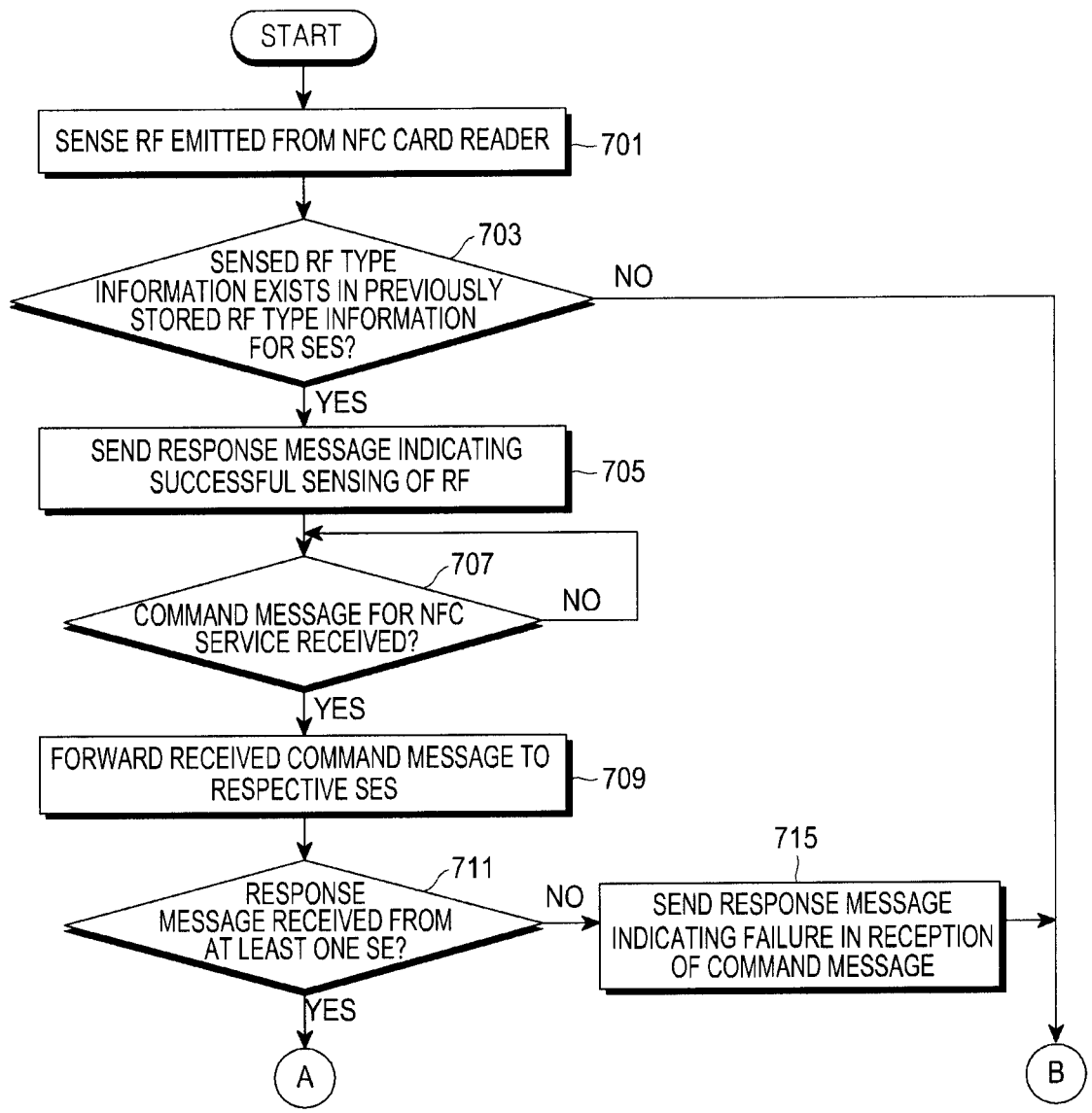
FIGS. 7A and 7B are flowcharts providing an overview of exemplary operation of a method for selecting an SE in an NFC device according to a third exemplary embodiment of the present invention.
Figure 7B:
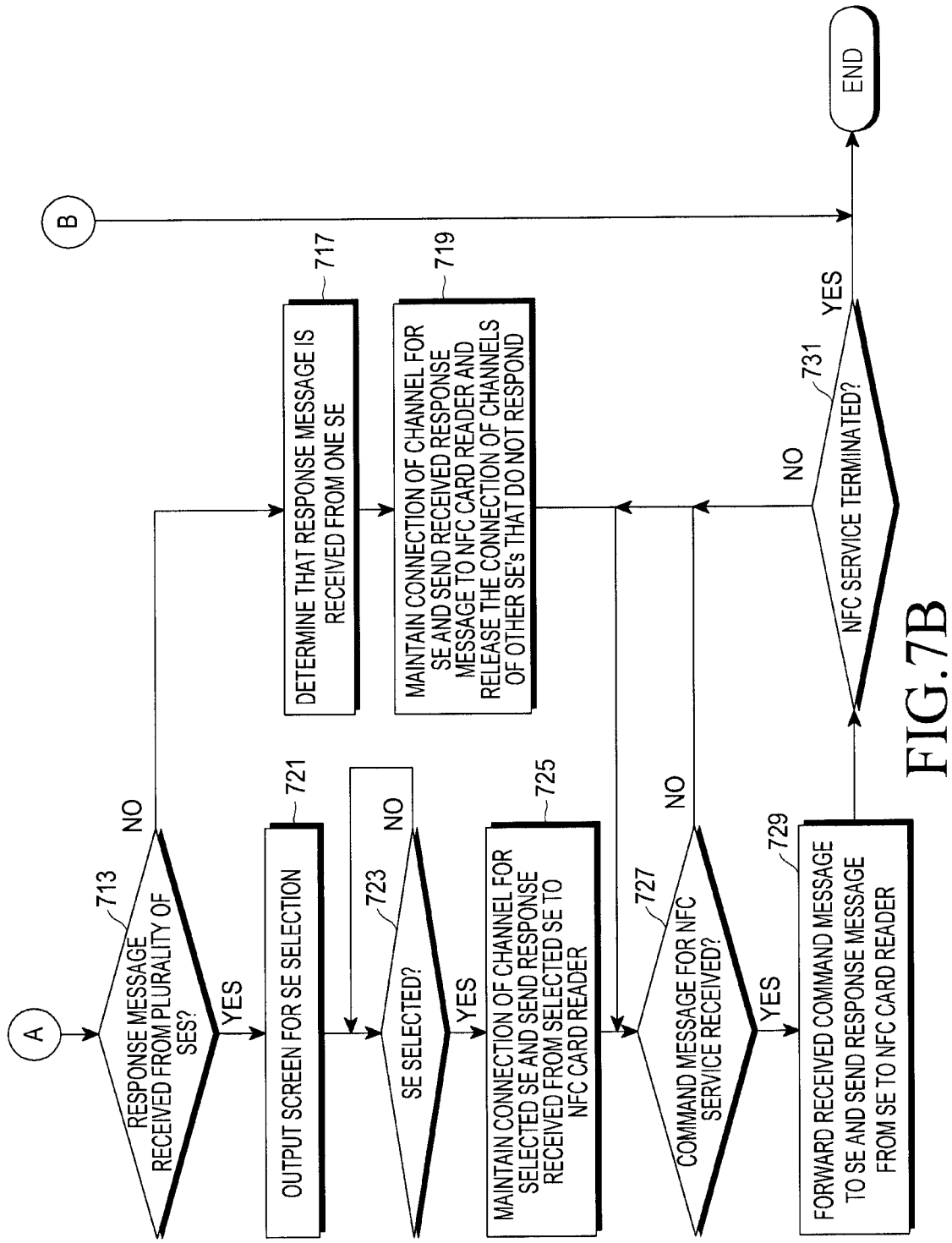

FIGS. 7A and 7B are flowcharts describing exemplary operation of a method for selecting an SE in the NFC device 209 according to a third exemplary embodiment of the present invention.

Referring now to FIGS. 7A and 7B, it is shown in FIG. 7A at step 701 the portable terminal 101 senses an RF emitted from the NFC card reader 103 and generates RF type information regarding the sensed RF in step 701, and then performs step 703.

At step 703, the portable terminal 101 checks to determine whether the generated RF type information exists in previously-stored RF type information for a plurality of SEs. If the generated RF type information does not exist in the previously-stored RF type information, the portable terminal 101 terminates the NFC service. On the other hand, if the generated RF type information exists, the portable terminal 101 then performs step 705.

At step 705, the portable terminal 101 sends to the NFC card reader 103 a response message indicating that the RF has been successfully sensed, and then performs step 707.

At step 707, the portable terminal 101 checks whether a command message for the NFC service is received from the NFC card reader 103. If the command message is received, the portable terminal 101 then performs step 709; otherwise, the portable terminal 101 repeats performance of step 707.

At step 709, the portable terminal 101 forwards the received command message to each of the plurality of SEs, and at step 711 checks whether or not a response message with respect to the command message is received from at least one of the plurality of SEs. If no response message is received in response to the command message, the portable terminal 101 then performs step 715; otherwise, the portable terminal 101 performs step 713 (FIG. 7B).

At step 715, the portable terminal 101 generates a response message indicating a processing failure with respect to the command message, sends the generated response message to the NFC card reader 103, and terminates the NFC service.

At step 713, the portable terminal 101 checks whether a response message is received from each of the plurality of SEs. If the response message is received from each of the plurality of SEs, the portable terminal 101 performs step 721; if the response message is received from one of the plurality of SEs, the portable terminal 101 performs step 717.

At step 719, the portable terminal 101 maintains connection of a channel for only the SE which sends the response message and releases connection of channels for the other SEs which does not send the response message, and then preforms step 719. In step 719, the portable terminal 101 sends the response message received from the SE to the NFC card reader 103 and performs step 727.

In step 721, the portable terminal 101 outputs icons indicating the plurality of SEs or IDs of application programs associated with the plurality of SEs for SE selection, and performs step 723. Herein, the IDs of the application programs may be at least one of the icons and names indicating the application programs. For example, the portable terminal 101 may output the names of the application programs associated with the plurality of SEs, as shown on the screen 501.

In step 732, the portable terminal 101 checks to determine whether one of the pluralities of SEs is selected. If a particular SE is selected out of the plurality of SEs, the portable terminal 101 performs step 725; otherwise, the portable terminal 101 repeats performance of step 723. If a name of an application program is selected from among names of application programs associated with the plurality of SEs as shown on the screen 503, the portable terminal 101 may determine that an associated particular SE is selected from among the plurality of SEs.

At step 725, the portable terminal 101 maintains connection of a channel for only the selected SE, releases connection of channels for the other SEs, sends a response message received from the selected SE to the NFC card reader 103, and then performs step 727.

At step 727, the portable terminal 101 checks if a command message for the NFC service is received from the NFC card reader 103. If the command message is received, the portable terminal 101 performs step 729; otherwise, the portable terminal 101 repeats performance of step 727.

At step 729, the portable terminal 101 forwards the received command message to the SE for which channel connection is maintained, receives a response message with respect to the command message from the SE, sends the received response message to the NFC card reader 103, and the performs step 731.

At step 731, the portable terminal 101 checks to determine whether the NFC service is terminated. If the NFC service is not terminated, the portable terminal 101 performs step 727, otherwise, the process is terminated.

In this way, the present invention can effectively select one of a plurality of SEs by using application programs associated with the plurality of SEs. The present invention also effectively selects one of the pluralities of SEs, taking account of whether a command message received from an NFC card reader is responded.

While the present invention has been described with reference to detailed embodiments thereof such as a mobile communication terminal, various modifications may be made therein without departing from the scope of the present invention as defined by the following claims. Accordingly, the scope of the present invention should be defined by the claims and equivalents thereof rather than by the described embodiments.

In particular, while the NFC controller 301 is described as controlling the NFC device 29, the main controller 201 may control the NFC device 209. For example, the main controller 201 may select one of the pluralities of SEs by using one of the user selection scheme, the automatic selection scheme, and the hybrid scheme.

In addition, the main controller 201 displays names of application programs having authority for the NFC card mode, and upon user's selection of one of the displayed names, generates an ID indicating an SE associated with the selected application-program name, but this operation may be performed by the NFC controller 301.

As is apparent from the foregoing description, the present invention can efficiently select one of the pluralities of SEs by using application programs associated with the plurality of SEs.

Moreover, the present invention can effectively select one of the pluralities of SEs, taking account of whether the command received from the NFC card reader is responded.

The above-described methods according to the present invention can be implemented in hardware, firmware or as software or computer code that is stored in a recording medium such as a CD ROM, flash, EPROM, EEPROM, RAM, a floppy disk, thumbnail drive, a hard disk, or a magneto-optical disk or computer code downloaded over a network originally stored on a remote recording medium and then stored on a non-transitory medium and loaded into hardware such as a processor or microprocessor. The machine executable code stored on the non-transitory machine readable medium can be stored on a local recording medium, and loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" constitutes hardware in the claimed invention. Finally, the claimed invention can include the use of a location information server comprising more than one server, such as a proxy server.

While the present invention has been particularly shown and described with reference to exemplary embodiments thereof, it will be understood by those of ordinary skill in the art that various embodiments or modifications may be made therein without departing from the spirit and scope of the present invention as defined by the following claims. Accordingly, the scope of the present invention should be defined by the claims and equivalents thereof rather than by the described embodiments.

What is claimed is:

1. An apparatus for selecting a Secure Element (SE) in a Near Field Communication (NFC) device, the apparatus comprising:
    an SE unit comprising a plurality of SEs;
    an NFC controller configured to activate an SE from the plurality of SE's to forward data thereto in which the NFC controller is configured for operation under a plurality of respective schemes including a User Selection Scheme, an Automatic Selection Scheme and a Hybrid Scheme;
    a display unit; and
    a main controller for controlling the display unit to display identifiers (IDs) indicating one or more application programs corresponding to the plurality of SEs, and upon selection of one application program ID, provides the NFC controller with the selected application-program ID corresponding to the SE to be activated from among the plurality of SEs corresponding to the selected application-program ID.

2. The apparatus of claim 1, wherein the IDs comprise at least one of names and icons of the one or more application programs.

3. The apparatus of claim 1, wherein the main controller controls display of the IDs upon entering a card mode.

4. The apparatus of claim 1, wherein the main controller, upon entering a card mode, searches for a plurality of application programs which have authority for the card mode based on program specifications of all of the plurality application programs, identifies SEs corresponding to the plurality of application programs found in the search, and displays IDs of the plurality of application programs found in the search.

5. The apparatus of claim 4, wherein the program specifications of all of the plurality of application programs comprise indicating authority for the card mode for each individual application programs, names of individual application programs, and IDs indicating SEs associated with the application programs.

6. An apparatus for selecting a Secure Element (SE) in a Near Field Communication (NFC) device, the apparatus comprising:
    an SE unit comprising a plurality of SEs; and
    a main controller configured to, upon receiving a command message for an NFC service from an NFC card reader, transmit the command message to a plurality of SEs, to select one of the plurality of SEs which send a response message in response to the command message, to maintains a channel connection for the one SE which sends the response message and to releases channel connections for a remainder of the plurality of SEs, and process the NFC service through the SE for which channel connection is maintained.

7. The apparatus of claim 6, wherein when the main controller receives the response message from each of the plurality of SEs, controls a display of identifiers (IDs) indicating the plurality of SEs, and upon selection of one of the displayed IDs, the main controller maintains the channel connection for an SE corresponding to a selected ID from among the plurality of SEs and releases channel connections for the remainder of the plurality of SEs, and processes the NFC service through the SE for the selected ID in which channel connection is maintained.

8. The apparatus of claim 7, wherein the IDs comprise at least one of names and icons of one or more application programs corresponding to the plurality of SEs.

9. The apparatus of claim 7, wherein the main controller, upon entering a card mode, searches for a plurality of application programs having authority for the card mode based on programs specifications from among all application programs, identifies SEs of the plurality of SEs corresponding to application programs found in the search, and displays IDs of the application programs found in the search.

10. The apparatus of claim 9, wherein the program specifications comprise authority for the card mode, names of the application programs, and IDs indicating SEs from the plurality of associated with the application programs.

11. A method for selecting a Secure Element (SE) in a Near Field Communication (NFC) device, the method comprising:
    displaying identifiers (IDs) by a display unit indicating application programs corresponding to a plurality of SEs; and
    upon selection of one of the application-program IDs, activating by an NFC controller an SE corresponding to the selected application-program ID from among the plurality of SEs in which the NFC controller is configured for operation under a plurality of respective schemes including a User Selection Scheme, an Automatic Selection Scheme and a Hybrid Scheme.

12. The method of claim 11, wherein the IDs comprise at least one of names and icons of the application programs.

13. The method of claim 11, wherein the displaying of the IDs comprises displaying the IDs upon entering a card mode.

14. The method of claim 11, wherein the displaying of the IDs comprises:
    upon entering a card mode, searching by a main controller for a plurality of application programs having authority for the card mode from among all application programs based on program specifications; and
    identifying SEs corresponding to the application programs found in the search and displaying IDs of the application programs found in the search.

15. The method of claim 14, wherein the program specifications comprise authority for the card mode, names of the application programs, and IDs indicating respective SEs associated with the application programs.

16. A method for selecting a Secure Element (SE) in a Near Field Communication (NFC) device, the method comprising:
    upon receiving a command message for an NFC service from an NFC card reader, transmitting the command message to a plurality of SEs;
    selecting one of the plurality of SEs which send a response message in response to the command message;
    maintaining a channel connection of the SE which sends the response message and releasing channel connections for remainder of the plurality of SEs; and
    processing the NFC service through the SE for which channel connection is maintained.

17. The method of claim 16, further comprising:
    upon receiving the response message from each of the plurality of SEs, displaying identifiers (IDs) indicating each one of the plurality of SEs;
    when one of the displayed IDs is selected, maintaining a channel connection for an SE corresponding to the selected ID from among the plurality of SEs and releasing channel connections for a remainder of the plurality of SEs; and processing the NFC service through the SE for the selected ID in which the channel connection is maintained.

18. The method of claim 17, wherein the IDs comprise at least one of names and icons of one or more application programs.

19. The method of claim 17, wherein the displaying of the IDs comprises:

upon entering a card mode, searching for a plurality of application programs having authority for the card mode from among all application programs based on program specifications of all of the application programs; and identifying respective SEs corresponding to the application programs found in the search and displaying IDs of the application programs found in the search.

20. The method of claim 19, wherein the program specifications comprise authority for the card mode, names of the application programs, and IDs indicating SEs associated with the application programs.

\* \* \* \* \*